No. 894,890. PATENTED AUG. 4, 1908.
S. W. KEYS.
DUST COLLECTOR.
APPLICATION FILED JUNE 19, 1906.
3 SHEETS—SHEET 1.
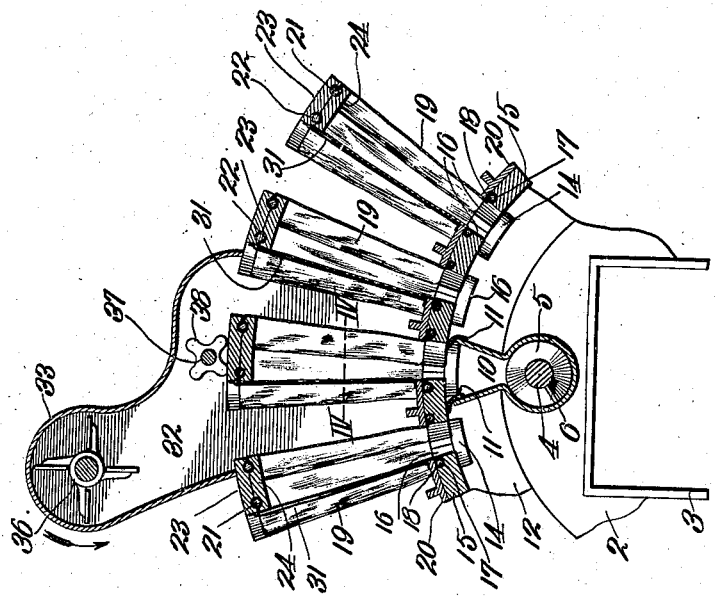
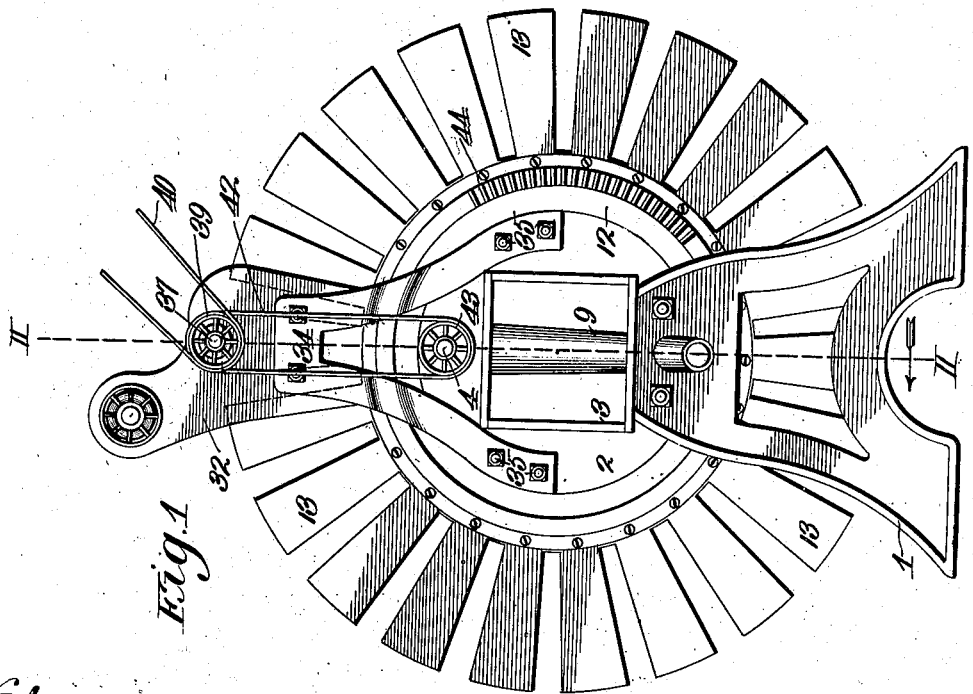
Witnesses
Frank R. Glow
H. C. Rodgers
Inventor
S. W. Keys.
By George W. Thorpe
Atty.

No. 894,890. PATENTED AUG. 4, 1908.
S. W. KEYS.
DUST COLLECTOR.
APPLICATION FILED JUNE 19, 1906.
3 SHEETS—SHEET 2.
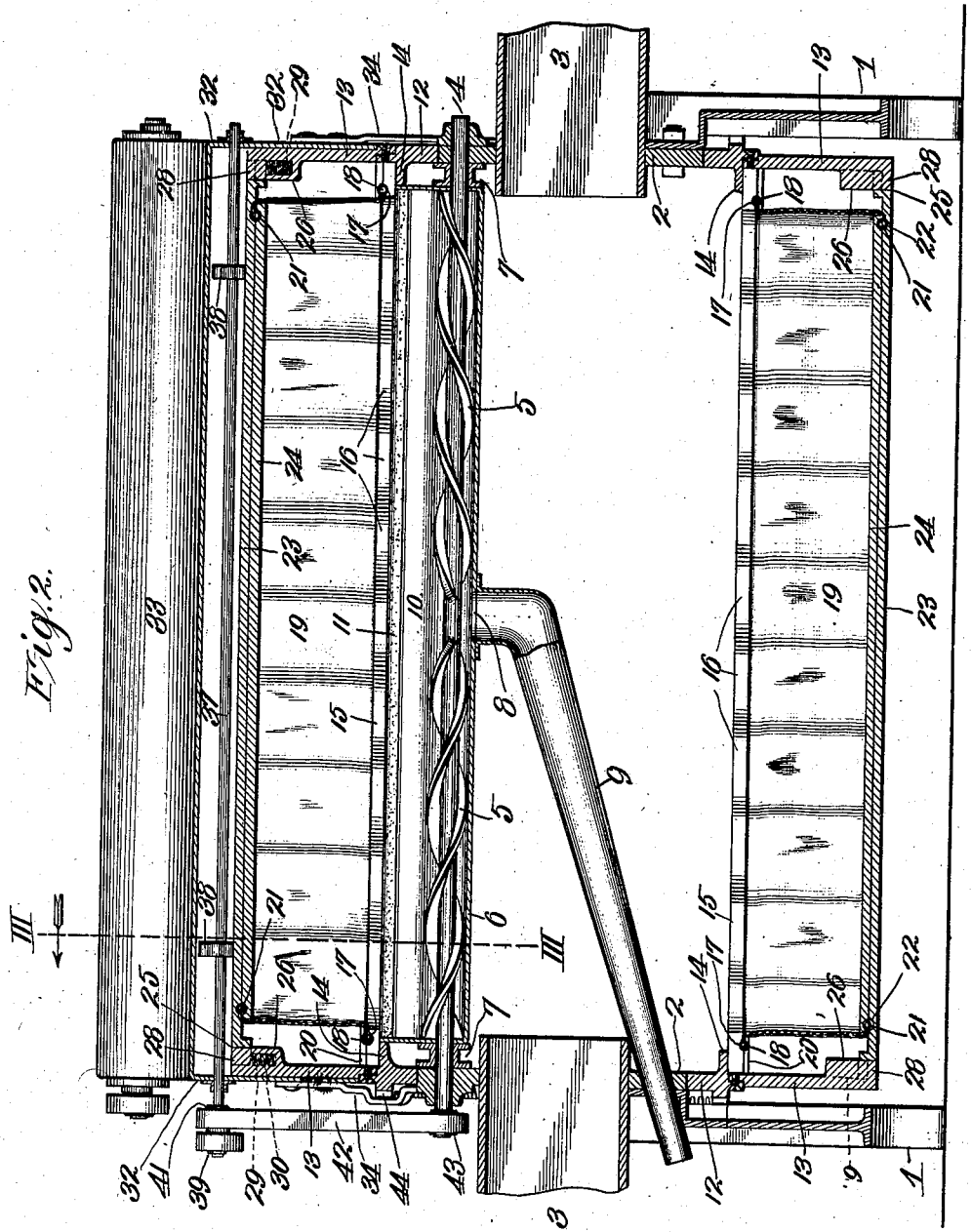
Witnesses
Frank R. Glore
H. C. Rodgers
Inventor
S. W. Keys.
By [signature]
Atty.

No. 894,890.  
S. W. KEYS.  
DUST COLLECTOR.  
APPLICATION FILED JUNE 19, 1906.  
PATENTED AUG. 4, 1908.  
3 SHEETS—SHEET 3.
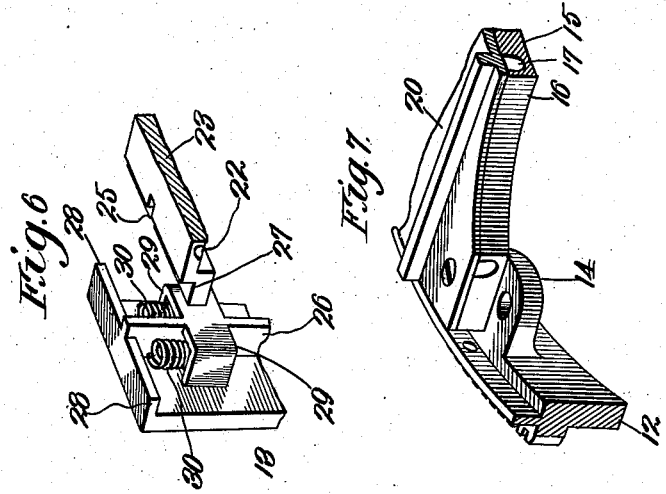
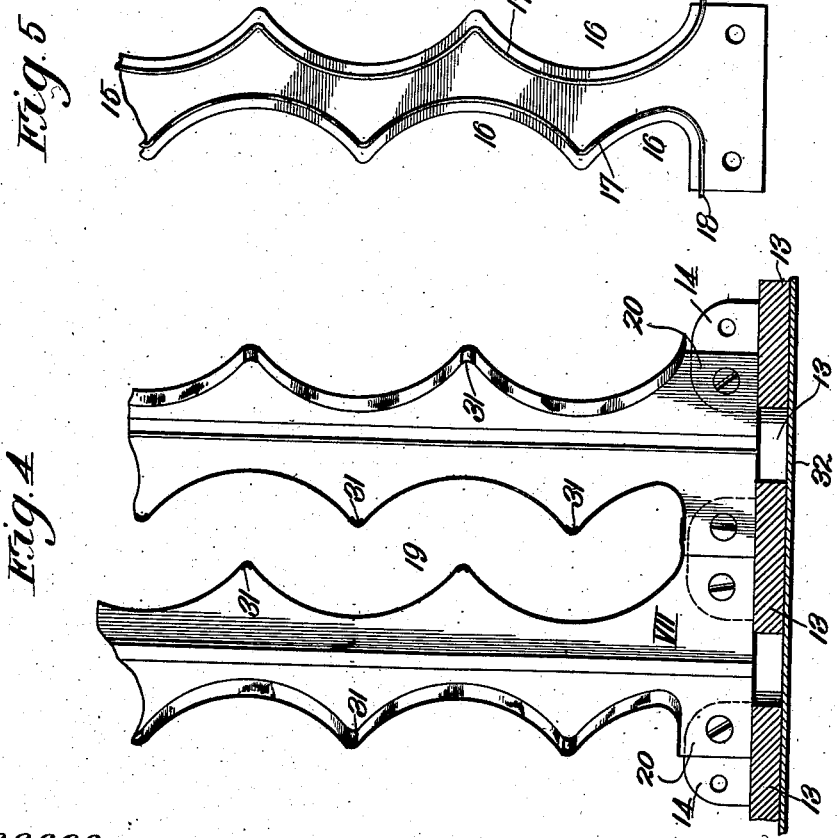
Witnesses  
Frank R. Glore  
H. C. Rodgers
Inventor  
S. W. Keys.  
By George Y. Thorp Jr. Atty.

UNITED STATES PATENT OFFICE.

SAMUEL W. KEYS, OF PARKVILLE, MISSOURI.

DUST-COLLECTOR.

No. 894,890.

Specification of Letters Patent.

Patented Aug. 4, 1908.

Application filed June 19, 1906. Serial No. 322,463.

*To all whom it may concern:*

Be it known that I, SAMUEL W. KEYS, a citizen of the United States, residing at Parkville, in the county of Platte and State of Missouri, have invented certain new and useful Improvements in Dust-Collectors, of which the following is a specification.

This invention relates to dust collectors and more especially to that type comprising a rotating cylinder in which the dust-laden air is discharged, peripheral receptacles to receive the dust-laden air and retain the dust while permitting the air to escape to the atmosphere, a conveyer with which the peripheral receptacles successively communicate, and means for discharging the dust from the said receptacles into said conveyer, and my object is to produce a machine of this character which operates efficiently and reliably.

To this end the invention consists in certain novel and peculiar features of construction and organization as hereinafter described and claimed; and in order that it may be fully understood reference is to be had to the accompanying drawings, in which—

Figure 1, is an end view of a dust collector embodying my invention. Fig. 2, is a section taken mainly on the line II—II of Fig. 1. Fig. 3, is a section taken on the line III—III of Fig. 2. Fig. 4, is an enlarged section taken on the line IV—IV of Fig. 3. Fig. 5, is a detail outer face view of one of the longitudinal peripheral bars of the cylinder. Fig. 6, is a detail perspective of an arm of one of the peripheral receptacles and of the contiguous end of the outer wall of said receptacle; said arm and outer wall being detached. Fig. 7, is an enlarged detail sectional perspective view of a portion of one of the rings, one of the bars connecting the rings and the clamping bar upon the first-named bar.

In the said drawings, 1 indicates the supporting legs, 2 circular heads bolted to said legs, and 3 air trunks projecting into the machine through said heads and bearing a rigid relation to the latter.

4 indicates a longitudinal shaft extending through and journaled in said heads vertically above the center of the same and rigid with said shaft are spiral blades 5, which by preference, when rotated in the proper direction tend to feed toward the center of the machine.

6 indicates a trough containing the spiral conveyer and secured rigidly as at 7 or otherwise to the heads 2, and provided centrally with a discharge opening 8, with which the upper end of a discharge spout 9 communicates, the opposite end of said spout projecting through one of the heads 2 for the purpose of delivering the dust, as hereinafter explained, to a receptacle or conveyer not shown, by which it may be removed from the building or to any point desired. The trough is provided with a flaring mouth 10, which projects above the plane of the circumference of heads 2 and is equipped with flexible edges 11, for a purpose which hereinafter appears.

12 indicates rings journaled upon heads 2, so as to be capable of rotating thereon, the joint being of any suitable character practically impervious to the passage of air, and projecting radially outward from said rings are a plurality of arms 13, which form the end walls of dust receptacles hereinafter described.

14 indicates lugs projecting inward from rings 12, and 15 longitudinal bars connecting alined lugs of the rings and secured rigidly thereto in any suitable manner, said bars being adapted in the rotation of the machine to engage and sweep past the flexible edges 11 of the mouth of the trough and during such passage establish a substantially airtight relation therewith.

The bars 15 have their opposite edges scalloped as shown at 16, so that the scallops at one side shall break joint with those at the opposite side. The bars are provided in their outer faces with grooves 17 paralleling said scalloped margins to receive wire frames 18 around which are secured the inner edges of fabric tubes 19, said frames engaging adjacent bars 15, so that their tubes 19 shall communicate with the space or opening between said bars, the inner ends of the tubes corresponding to the scalloped configuration of said frames.

To secure the inner ends of the tubes reliably to the bars 15 with an air-tight relation, correspondingly shaped bars or plates 20 (shown as ribbed plates in the drawings) fit against the outer faces of said bars and clamp the frames and fabric tubes reliably thereto as shown most clearly in Fig. 3.

The tubes by preference increase in size toward their outer ends and at such ends are secured upon frames 21 which are also scalloped to conform to the frames 17, each frame 21 fitting in the scalloped groove 22 in bars 23 forming the outer walls of the peripheral receptacles, the inner bars or plates 24 corresponding in configuration to bars or outer walls 23, being secured to the latter to hold frames 21 and the outer ends of the tubes reliably in position. The outer walls 23 of the receptacles are provided with end notches 25 to slidingly engage ribs 26 of the ring arms or peripheral-receptacle end walls 13, and said outer walls are provided with transverse recesses 27 to receive the inwardly projecting flanges 28 of said end walls 13. The latter are provided with pockets 29 containing expansive coil springs 30 which bear outwardly against the outer walls of the peripheral receptacles, and clamp the latter against the inner sides of flanges 8.

31 indicates tapes secured at their opposite ends in any suitable manner to the plates 20, and the outer walls of the peripheral receptacles and held normally under tension by the outward pressure of springs 30, it being understood in this connection that the fabric tubes are not under any material tension but are sufficiently long to have more or less lateral play or movement between their ends and for this reason I prefer to make such tubes with their scallops breaking joint or staggered, as by this arrangement, the tubes within a given space will possess a maximum range of flapping movement without conflict.

A hood for successively receiving the peripheral receptacles, comprises vertical end walls 32 and a connecting portion 33, the end walls and connecting portion bearing such relation to the peripheral receptacles of the cylinder as to provide a substantially air tight joint from the time such receptacles start into until they emerge from the hood, and said hood is preferably carried rigidly by standards 34, secured at their lower ends as at 35 to the stationary heads 2.

36 is a fan within the hood adapted to be revolved at a high rate of speed, in any suitable manner, and 37 a shaft extending through the hood and provided with one or more knocker wheels 38, for knocking upon the outer walls 23 of the receptacles while within the hood, this knocking tending to jar and vibrate the fabric tubes and thereby assist in dislodging the dust therein, it being understood that the receptacle when engaged by the rotary knocker is vertically above the trough in order that the dislodged dust may pass into the latter and be discharged from the machine, the flexible edges 11 of the flaring mouth of the trough engaging the inner sides of the bars 15 at the opposite sides of the engaged receptacle. Any suitable means may be employed to rotate the knocker shaft 37, that shown being a pulley 39 driven by a belt 40 and said knocker shaft is provided with a second pulley 41 connected by a belt 42 to a pulley 43 on one end of the conveyer shaft to effect the operation of the conveyer, it being understood of course that other means for operating the conveyer may be employed.

One of the rings of the cylinder is provided with a gear wheel 44 adapted to be operated intermittently by any suitable means not shown, each intermittent movement of the cylinder corresponding to the distance between adjacent receptacles, and the hood is of such proportion that when any receptacle is being acted upon, the preceding one forms a closure for one side of the hood and the succeeding one a closure for the opposite side of the hood. In actual practice the dust-laden air is being blown continuously through the air trunks 3 into the cylinder, and passes outward between the bars 15 into all of the receptacles except the one which is vertically above the trough. The air escapes through the fabric and leaves the dust clinging to the inner sides of the tubes, the tapes at the outer sides of the tubes preventing the latter from bulging outward materially under such pressure for the purpose of relieving them of considerable strain.

The pressure in the hood is preferably less than that in the cylinder, consequently the pressure in the tubes at opposite sides of the tube in communication with the trough, holds said tubes expanded against the pressure in the hood and prevents the escape of the air from the hood through said tubes, it being immaterial whether air from the cylinder passes through said tubes forming a closure for the opposite sides of the hood because such air by its passage through said tubes will be cleaned and will coöperate with the air from the fan in effecting the collapse or partial collapse of the tube in communication with the trough, this air pressure flirting the sides of said tube sharply inward so as to dislodge the dust clinging to the inner side and cause it to pass down with any air passing into said tube from the hood, to the conveyer, whence it is discharged through the spout.

By reason of the peculiar construction of the peripheral receptacles it is obvious that defective fabric tubes may be easily and quickly replaced by perfect ones, all that is necessary being to remove the outer walls 23 of contiguous receptacles and then remove plates 20 at opposite sides of said tube. The tube can then be lifted out of the machine.

From the above description it will be apparent that I have produced a dust collector embodying the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. In a dust collector, a cylinder having a peripheral opening, a peripheral receptacle consisting of a fabric tube closed at its outer end and communicating at its inner end with said opening and fluted radially, the flutes of the tube at opposite sides of said opening being pitched outward from and staggered with relation to each other, and flexible stops extending substantially radially of the cylinder and longitudinally of and at the outer sides of the tube between the outwardly bowed flutes of the latter.

2. In a dust collector, a cylinder having a peripheral opening, a peripheral receptacle embodying a fabric tube closed at its outer end and communicating at its inner end with said opening and fluted longitudinally, the flutes extending radially of the cylinder, and stops extending longitudinally of the tube to relieve the latter of undue tension; said stops being arranged externally of the tube and between the flutes thereof.

3. In a machine of the character described, the combination of a cylinder having a longitudinally extending peripheral opening, a fabric tube secured at its inner end to said cylinder around said opening and fluted longitudinally, the flutes of the tube extending radially of the cylinder, a wall closing the outer end of said tube, arms rigid with the cylinder and projecting radially outward therefrom, and springs pressing against said arms and said wall to hold the tube yieldingly tensioned.

4. In a machine of the character described, the combination of a cylinder having a longitudinally extending peripheral opening, a fabric tube secured at its inner end to said cylinder around said opening and fluted longitudinally, the flutes of the tube extending radially of the cylinder, a wall closing the outer end of said tube, arms rigid with the cylinder and projecting radially outward therefrom, spring pressing against said arms and said wall to hold the tube yieldingly tensioned, and means for knocking the outer wall against the resistance of said springs.

5. In a machine of the character described, the combination of a cylinder having a longitudinally extending peripheral opening, a fabric tube secured at its inner end to said cylinder around said opening and fluted longitudinally, the flutes of the tube extending radially of the cylinder, a wall closing the outer end of said tube, arms rigid with the cylinder and projecting radially outward therefrom, springs pressing against said arms and said wall to hold the tube yieldingly tensioned, means for knocking the outer wall against the resistance of said springs, and flexible stops secured at their opposite ends to the cylinder and said outer walls and occupying the flute of said tubes.

6. In a machine of the character described, the combination of a cylinder having a longitudinally extending peripheral opening, a fabric tube secured at its inner end to said cylinder around said opening and fluted longitudinally, the flutes of the tube extending radially of the cylinder, a wall closing the outer end of said tube, arms rigid with the cylinder and projecting radially outward therefrom, spring pressing against said arms and said wall to hold the tube yieldingly tensioned, means for knocking the outer wall against the resistance of said springs, a trough within the cylinder and adapted to receive the discharge from said tube, and a driven conveyer in said trough.

7. In a machine of the character described, the combination of a cylinder having a longitudinally extending peripheral opening, a fabric tube secured at its inner end to said cylinder around said opening and fluted longitudinally, the flutes of the tube extending radially of the cylinder, a wall closing the outer end of said tube, arms rigid with the cylinder and projecting radially outward therefrom, springs pressing against said arms and said wall to hold the tube yieldingly tensioned, means for knocking the outer wall against the resistance of said springs, a trough within the cylinder and adapted to receive the discharge from said tube, a driven conveyer in said trough, a hood enveloping said tube, and means to force air against the outer side of the tube.

8. In a machine of the character described the combination of supporting legs, circular heads rigid therewith, air trunks to discharge air through said heads, a rotatable cylinder comprising rings journaled on said heads, radial arms projecting outward from the rings and longitudinal bars suitably spaced and connecting said rings, a trough extending longitudinally between and rigid with said heads and provided with a spout projecting externally of the machine, a driven conveyer within the trough, longitudinal walls between the outer ends of opposite radial arms, flexible tubes secured at their outer ends to said walls and at their inner ends to contiguous longitudinal bars of said cylinder and communicating with the spaces between said bars; said tubes being fluted radially of the cylinder and one of them in communication with the trough, stops connecting the cylinder with the said outer walls and engaging the flutes of the tubes externally of the latter, a hood to receive the tube in communication with the trough, provided with opposite openings closed by the tubes at opposite sides of the first-named tube, and means for forcing air through the hood.

9. In a dust collector, a cylinder having a peripheral opening and outwardly projecting radial arms and provided with longitudinal openings between opposite arms, and a peripheral receptacle carried by the cylinder and consisting of an outer wall slidable inward and outward of opposite arms, a fluted flexible tube arranged radially of the cylinder with the flutes also extending radially of the cylinder, correspondingly fluted or scalloped wire frames secured to the opposite ends of the tube, one of said wire frames being secured to the inner side of said outer wall and the other to the outer side of the cylinder and around the longitudinal opening thereof to establish communication between the cylinder and the peripheral receptacle.

10. In a dust collector, a cylinder, longitudinal bars secured thereto and spaced apart and provided with scalloped grooves in their outer sides, arms projecting from the cylinder at opposite ends of the opening formed between said longitudinal bars, outer walls connecting said arms and provided in their inner sides with scalloped grooves, frames scalloped to correspond with and fitting in said grooves, flexible tubes mounted at their ends on the scalloped frames fitting respectively in said grooves, plates secured on said spaced bars to clamp thereto the frames engaging the grooves of said bars, and bars secured to the inner sides of the outer walls to clamp the outer frames of the tubes against said outer walls.

In testimony whereof I affix my signature, in the presence of two witnesses.

SAMUEL W. KEYS.

Witnesses:
  H. C. RODGERS,
  G. Y. THORPE.